United States Patent
Jones et al.

(10) Patent No.: US 8,172,074 B2
(45) Date of Patent: May 8, 2012

(54) AUTOMATED DELIVERY OF PARTS ACROSS DIVERSE MANUFACTURING STATIONS

(75) Inventors: Constance Jones, Newberg, OR (US);
Edwin G. Kepler, Cathlamet, WA (US);
Matthew Ferguson, Portland, OR (US)

(73) Assignee: Xerox Corporation, Norwalk, CT (US)

( * ) Notice: Subject to any disclaimer, the term of this patent is extended or adjusted under 35 U.S.C. 154(b) by 309 days.

(21) Appl. No.: 12/481,451

(22) Filed: Jun. 9, 2009

(65) Prior Publication Data

US 2010/0307888 A1 Dec. 9, 2010

(51) Int. Cl.
*B65G 43/10* (2006.01)
(52) U.S. Cl. ............ 198/575; 198/580; 134/68; 134/70
(58) Field of Classification Search .................. 134/67, 134/68, 70, 84; 198/570, 575, 578, 580, 198/582, 346.1, 346.2, 494
See application file for complete search history.

(56) References Cited

U.S. PATENT DOCUMENTS

| | | | | |
|---|---|---|---|---|
| 4,815,190 A | * | 3/1989 | Haba et al. | 198/346.1 |
| 5,885,529 A | * | 3/1999 | Babson et al. | 134/150 |
| 6,579,381 B1 | * | 6/2003 | Moscatelli | 134/28 |
| 6,711,798 B2 | * | 3/2004 | Sanders et al. | 198/346.2 |
| 2003/0102016 A1 | * | 6/2003 | Bouchard | 134/32 |

* cited by examiner

*Primary Examiner* — James R Bidwell
(74) *Attorney, Agent, or Firm* — Marger Johnson & McCollom PC

(57) ABSTRACT

A conveyor system includes a kitting conveyor subsystem arranged to transport kits to a washing station, a washing conveyor subsystem arranged to receive kits from a kitting conveyor subsystem and to transport washed kits towards an assembly station, and an assembly conveyor subsystem to receive washed kits from the washing conveyor subsystem and transport the kits to an assembly station, wherein the kits traverse the system from the kitting conveyor subsystem to the assembly station automatically without human intervention. A self-adjusting conveyor includes a table top containing a conveyor belt, legs arranged to support the table top, an adjustment fixture arranged to adjust the table top to a working height, and a controller to return the table top to a home height upon activation.

16 Claims, 7 Drawing Sheets

AUTOMATED DELIVERY OF PARTS ACROSS DIVERSE MANUFACTURING STATIONS

BACKGROUND

Some manufacturing processes involve assembly of smaller components into a larger component, referred to here as a composite component. Many of these smaller components must be gathered together into sets, or 'kitted,' as part of the process flow. Further, in many products the smaller components must be free of debris and otherwise clean. They may be assembled in a clean room environment, so the smaller components may be washed or otherwise cleaned prior to assembly in the clean room.

The assembly process may also include different manufacturing stations. For example, there may be a kitting station, a washing station, and an assembly station. The washing station may require some sort of washing fixture. The kitting station, the washing station, or some intermediate station may include mounting the smaller components to be washed as a kit into some sort of fixture. All of these various stations may have different speeds, differing amounts of space available and different security and protective requirements to ensure the components and the composite parts do not suffer any damage during the manufacturing process. Current processes involve inefficiency, more manual processes and may not meet the necessary throughput and quality requirements.

DETAILED DESCRIPTION OF THE EMBODIMENTS

Figure 1:
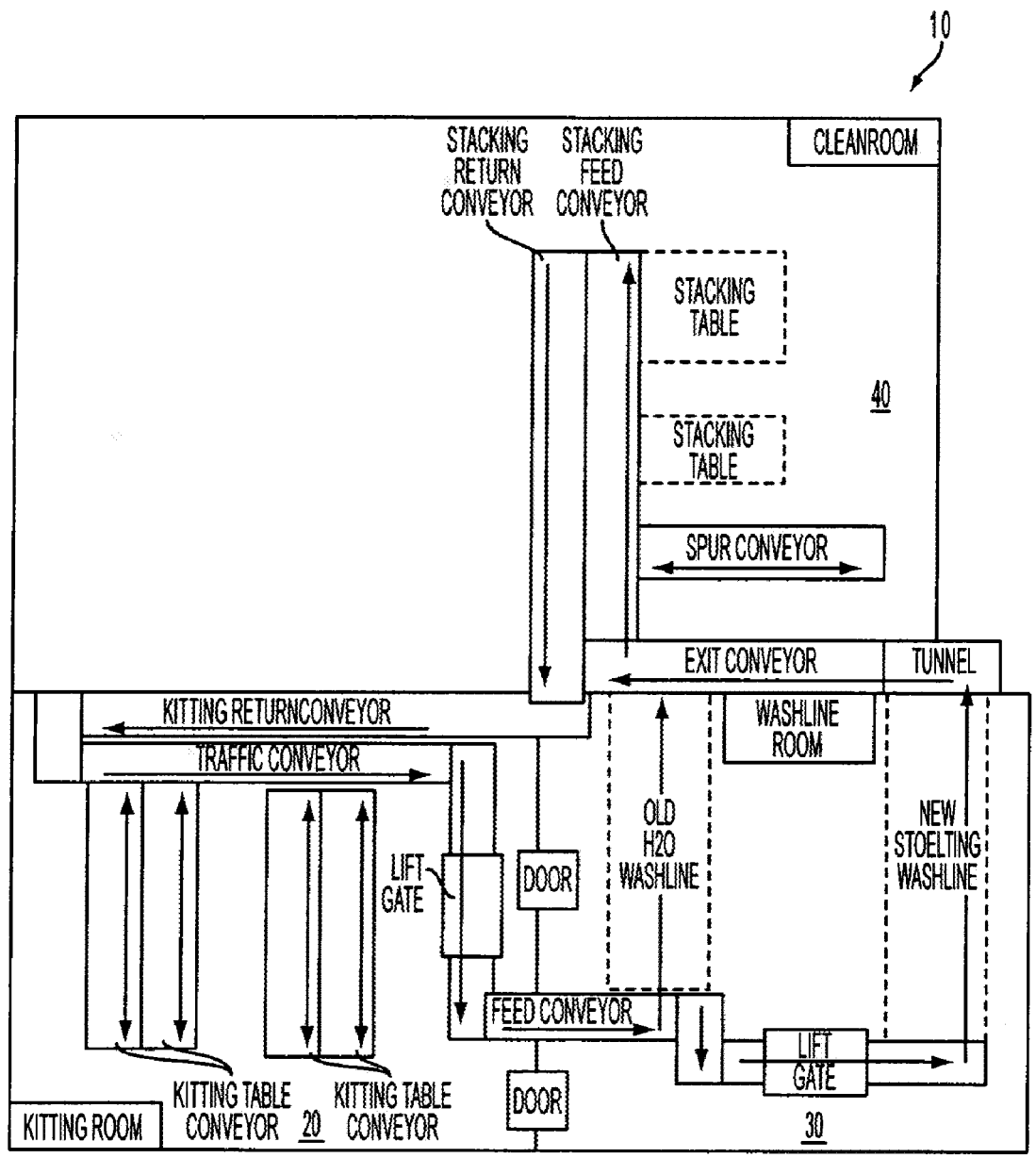
FIG. 1 shows an overall floor plan diagram for an embodiment of a manufacturing system for cleaning and assembly of components.

FIG. 1 shows an overall system view of a conveyor system 10 that transports kits of components through a washing station and into a clean room for assembly. The requirements of this process are challenging, especially when higher throughput while still maintaining quality is desired. Complex electrical and/or electronic parts or products may be manufactured in many different ways, but many of these parts undergo cleaning and assembly. Generally, prior to cleaning the parts are grouped into 'kits' or groups of the components that will all be assembled into one product or part.

This presents many challenges. Operators generally perform the kitting operation at kitting tables. For ergonomic reasons, it is desirable for the kitting tables to have adjustable heights so the operators can work more comfortably and efficiently at the tables to build the kits. In some instances, the kits are assembled into fixtures, such as wash racks. The kits are then washed, either in a fixture or not, but the kits must be oriented and positioned so that the washing process does not damage the components in the kits.

The washed kits are then taken to a clean room where they are assembled. Cleanliness is extremely important, as electronic and electrical components do not function correctly if there is debris or other contaminants that interfere with the operation. Other types of components that have fluid dispensing capabilities can suffer from blocked flow from contaminants. If the components are kitted in a fixture for washing, the fixtures must then be returned to the kitting room or station to allow the kitting operators to reuse them for another kit.

In many current systems, the assembly personnel or the kitting personnel must carry the fixtures back to the kitting room. The kitting personnel have to transport the kits from the kitting room to the washing room or station. The assemblers then need to remove the kits from the washline, carry them to their stations and assembly the products. This approach has many inefficiencies that prevent the system from meeting high throughput needs, as well as presenting several opportunities for dropping the kits, in fixtures or not, causing damage to the components. If the process uses fixtures, damage to those fixtures may also result from the handling of the fixtures.

Other considerations in the automation of this process include ensuring that enough space exists in portions of the process that may back up. For example, the washline generally runs automatically. The operators in the kitting station and the assembly station may need to work more slowly than the washline, so overflow space needs to be provided between the washline and the assembly station. Further, if the assembly is moving faster than the kitting, there needs to be space between the assembly and the kitting to allow for overflow.

Returning to FIG. 1, the conveyor system 10 is shown as having a kitting station or room 20, a washline room or station 30 and an assembly station 40. There may be stations within one big room, separate rooms or any combination thereof. For example, the kitting and washing stations may be arranged in the same room with the assembly station being in a clean room. Alternatively, if there is no clean room requirement, the kitting and assembly stations may be in the same room with the washing station being separate.

One unique aspect of the conveyor system 10 of FIG. 1 lies in the ability of a kit to traverse the entire system without any human intervention. "Without human intervention" refers to the actual movement of the kits or fixtures. Obviously, the kitting operator with interact with the kit and/or fixture, and there may be a washline operator that runs the washline machine or machines. However, once the kitting operator places the kit or fixture onto the conveyor system, it can traverse the system to the assembly station without anyone having to pick it up or move it from one place or the other.

Figure 2:
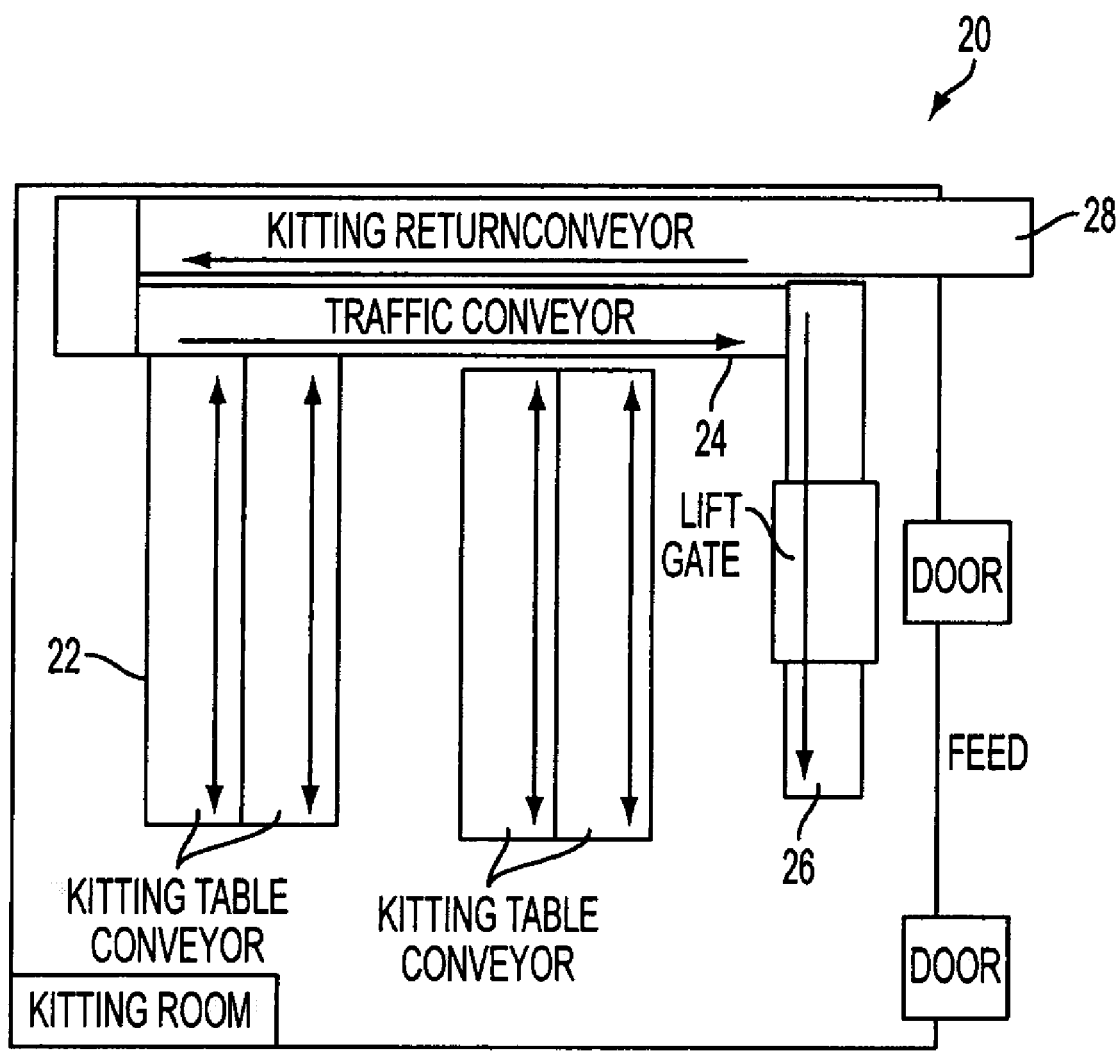
FIG. 2 shows an embodiment of a kitting portion of a manufacturing system.

FIG. 2 shows a more detailed view of the kitting room or station 20. To aid in understanding of the embodiments, the discussion will 'follow' a kit through the system. In this particular example, a fixture, such as a wash rack, is used. However, it must be understood that the fixture is optional and not required for implementation of the system. The existence of a fixture will have some impact on the return path, as the fixtures must be returned to the kitting room.

In FIG. 2, the operator assembles a kit and places it on a fixture for transport to the washline. The fixture is then placed on the kitting table conveyor 22. The kitting table conveyor may be oriented to be parallel to the washline. This allows the kitting operators to turn each fixture before and after placing the kits into the fixture. As will be discussed in more detail with regard to FIG. 8, the kitting table conveyors may be height adjustable tables that can automatically detect when they are at the same height as the rest of the conveyor system, referred to here as the 'home' height or position.

When the kitting table conveyors are left in the home position, they will automatically fill up with empty fixtures that have accumulated on the kitting return conveyor 28. Once the kitting table conveyor is full, the operator can move it to a comfortable position and fill the fixtures with kits. Once the fixtures on the kitting table conveyor are all full, the operator moves the kitting table conveyor to its home height and moves onto another kitting table conveyor.

Meanwhile, the fully kitted fixtures on the kitting table conveyor move onto the first portion of the traffic conveyor 24. The first portion of the traffic conveyor 24 is perpendicular to the kitting table conveyor 22 to allow the fixture to be 'picked up' by the traffic conveyor 24. The traffic conveyor has another portion 26 that is perpendicular to the first portion, transporting the fixtures to the intake of the washline. However, this particular configuration is optional. The traffic conveyor may have only one portion that transports the fixtures to the washline intake, depending upon the arrangement of the rooms or stations. Generally, the traffic conveyor remains empty unless actively unloading a kitting table conveyor and transporting fixtures to the washing conveyor subsystem.

Figure 3:
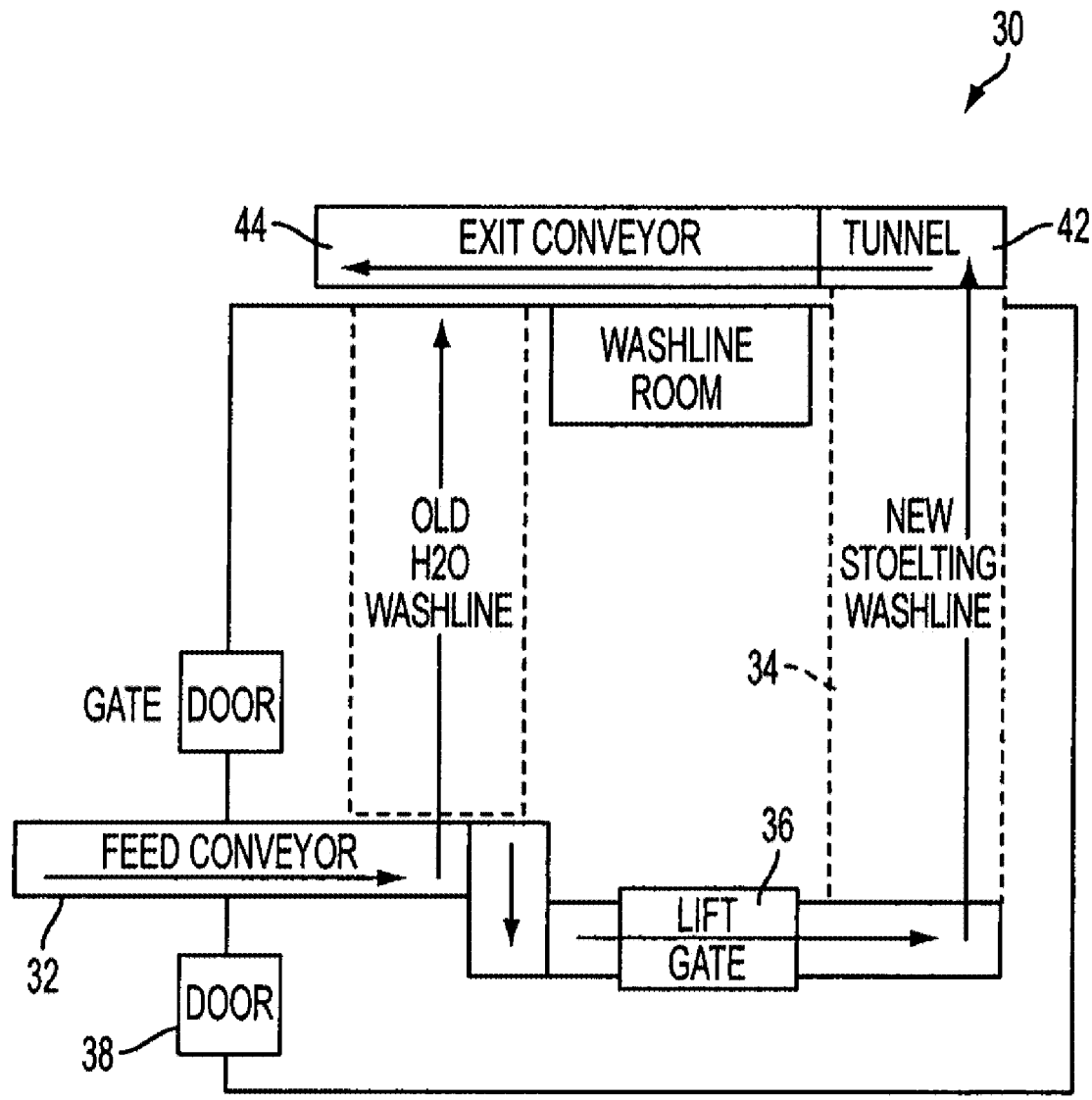
FIG. 3 shows a floor plan view of an embodiment of a cleaning portion of a manufacturing system.

Turning now to FIG. 3, one can see the feed conveyor 32 that bridges the kitting conveyor subsystem and the washline conveyor subsystem. The feed conveyor shown here has three portions, but this is not intended as a limitation or requirement of the system. The feed conveyor presents the properly oriented fixtures from the kitting station to the washline 34. The washline 34 may include a lift gate 36 that separates the fixtures undergoing washing from those that are waiting. This may act as a further preventative measure to avoid damaging the kits and fixtures. The lift gate 36 may also allow access to the washline controls for repairs and maintenance.

Another possibility is that there are two washlines in the washing conveyor subsystem. The feed conveyor 32 may feed the washline 34, while another washline may be available. However many washlines are available, they will generally traverse the path between the feed conveyor and the exit conveyor, the exit conveyor discussed with regard to FIG. 4.

Figure 4:
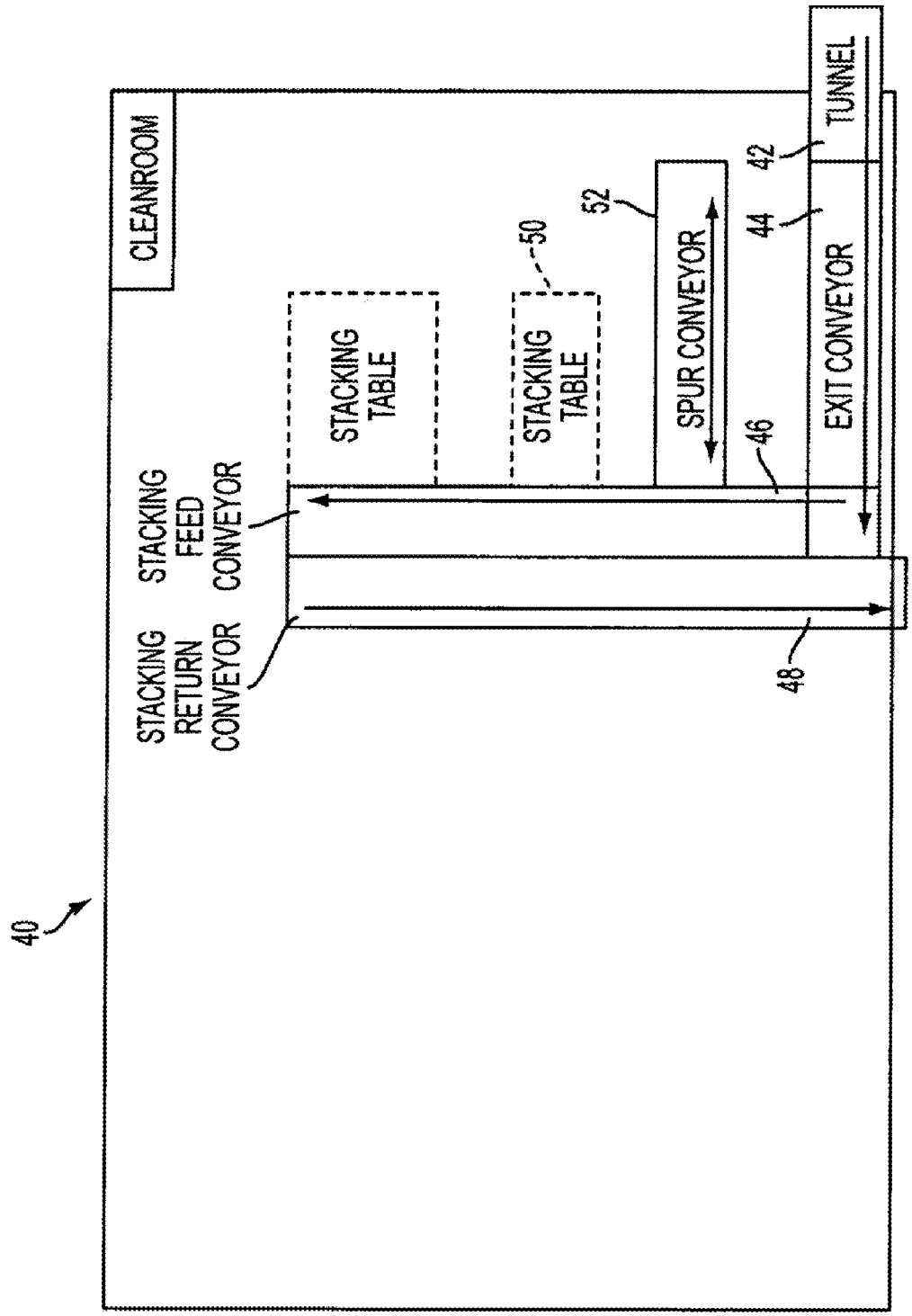
FIG. 4 shows a floor plan view of an embodiment of an assembly portion of a manufacturing system.

FIG. 4 shows an embodiment of an assembly conveyor subsystem 40. Referring briefly back to FIG. 3, one can see that the exit conveyor 44 may traverse however many washlines are present in the washing conveyor subsystem. Some washlines may not exit into the clean room, if a clean room is necessary. In that case, a portion of the exit conveyor may be covered in a tunnel 42 to protect the washed kits from any contaminants until they enter the clean room environment. The exit conveyor accepts fixtures from either washline. The exit conveyor may also descend from a washline, countertop level to an assembly station, table top level.

Returning to FIG. 4, the stacking feed conveyor 46 picks up fixtures from the exit conveyor and moves them to fixed stops next to the assembly tables, such as the stacking table 50. When the stops on the stacking feed conveyor are full, the overflow fixtures move onto the spur conveyor 52. When the stacking feed conveyor is emptied by the stacking operators, the spur conveyor reverses direction and sends the remaining fixtures to the stacking operators.

The stacking feed conveyor moves the fixtures holding the kits within a comfortable distance for the stacking operators to retrieve the kits and assembly them into the product or component. After the operators have emptied the fixtures, they place the fixtures on the stacking return conveyor 48. The stacking return conveyor moves the fixtures towards the clean room wall and ultimately towards the kitting room or station. For clean room environments, the clean room wall may have a very small opening to allow the stacking return conveyor to transport the fixtures outside the clean room. The size of the opening should be selected so as to not affect the air balance of the clean room.

The stacking return conveyor then interfaces with the kitting return conveyor 28, discussed above with regard to FIG. 2. This conveyor accumulates empty fixtures until one of the kitting table conveyors is in the home position and empty. When that occurs, the kitting return conveyor releases empty fixtures to the traffic conveyor and the kitting table conveyors are refilled.

As mentioned previously, one advantage of this system is that the kits can traverse the entire system in one direction without having to be moved or picked up by any operators. Another advantage of the system is that the operators in the stacking room or station do not have to leave the assembly station to retrieve kits or fixtures, nor do they have to leave the assembly station to place empty racks.

Figure 5:
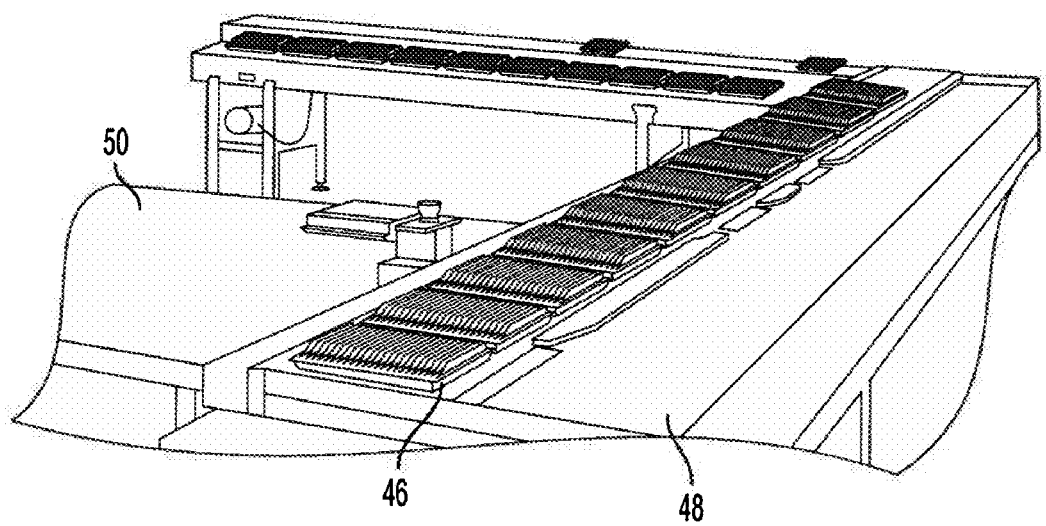
FIG. 5 shows a room view of an embodiment of an assembly portion of a manufacturing system.

FIG. 5 shows a detailed view of an embodiment of an assembly station. In this example, the kits consist of sets of steel plates that must be stacked together precisely to for the jet stacks of a print head. The plates are set into the wash rack fixtures in their proper order for stacking and traverse the system in that arrangement. In FIG. 5, fixtures of washed and kitted plates arrive on the stacking feed conveyor 46 to the assembly station 50. At the time at which this example is given, the stacking return conveyor is empty, awaiting empty wash racks.

Figure 6:
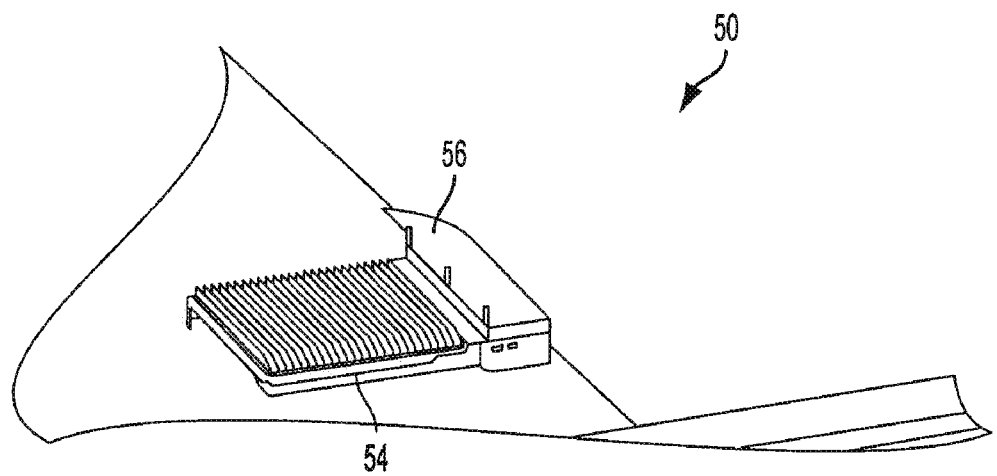
FIG. 6 shows an embodiment of an assembly station.

In this example, the assembly station 50 consists of a stacking station, shown in more detail in FIG. 6. The operator takes a full fixture, in this case wash rack 54, from the stacking feed conveyor. The wash rack has been populated by the set of jet stack plates such that the plates are in the correct order and orientation. The plates are then stacked on the stacking fixture 56 to form a jet stack for a print head. The stacks must be free of contaminants and are therefore stacked in a clean room.

Figure 7:
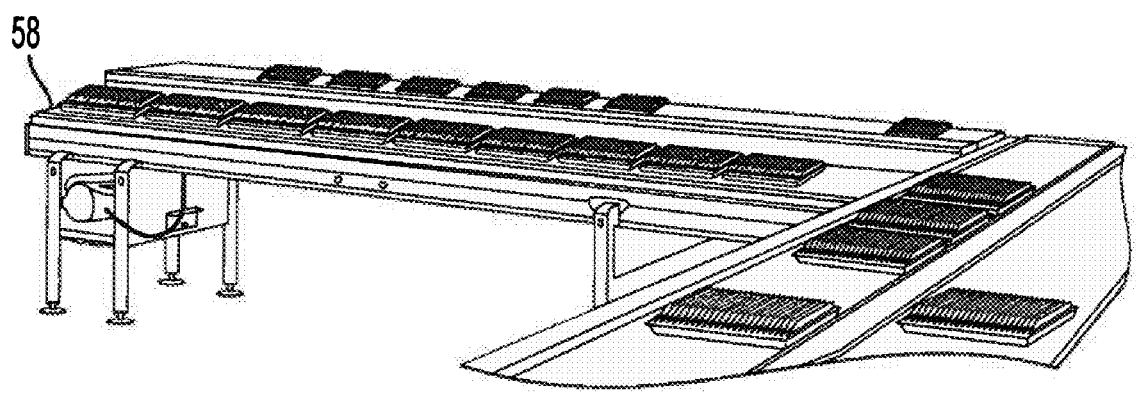
FIG. 7 shows a more detailed view of a conveyor system in an assembly portion of a manufacturing system.

FIG. 7 shows a closer view of the spur conveyor 58 in the stacking room. The feed conveyor is full, so the spur conveyor is holding an overflow of wash racks. When the feed conveyor empties, the spur conveyor will move the wash racks to the feed conveyor and ultimately to the operator. Upon emptying the wash rack, the stacking return conveyor transports the empty wash racks back to the kitting room for refilling.

Figure 8:
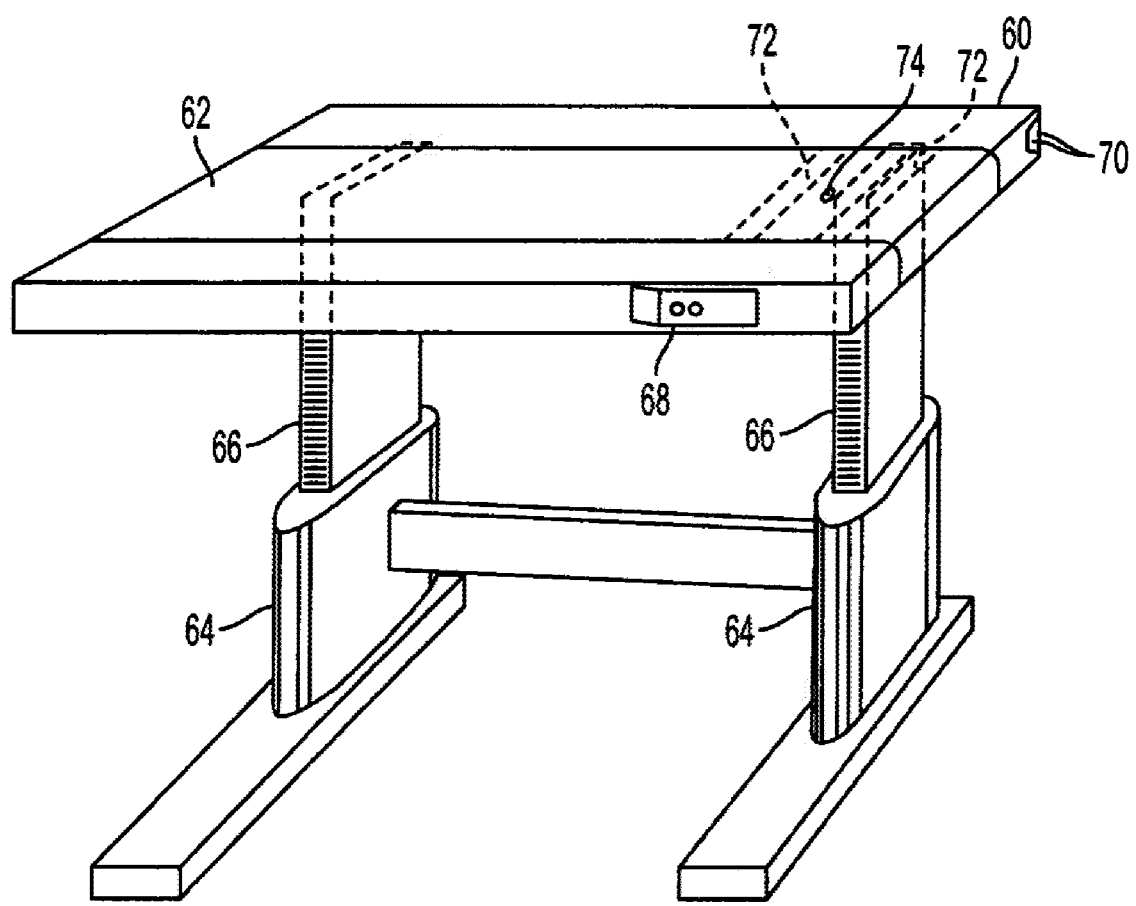
FIG. 8 shows an embodiment of a height adjustable table having an automated return to conveyor height.

As was mentioned previously, the kitting table conveyors in the kitting room may be height-adjustable. FIG. 8 shows an embodiment of a height-adjustable table. The height-adjustable table 60 has a conveyor 62 on the top. The table is supported by legs 64, having screw drive adjustable portions 66. When the controls 68 are operated, the legs 64 move up or down on the adjustable portions 66 to achieve the desired height. The desired height depends upon the operator and the traffic conveyor (shown in FIG. 2).

When the fixtures or the kitting conveyors are empty, the desired height would be operator adjusted to achieve a working height that the operator finds comfortable. Once the kitting table conveyor is full of fixtures or kits, the operator then presses a button and the conveyor will adjust to reach a 'home' height. The home height is that which matches the height of the traffic conveyor. This height may be determined by a sensor 70, such as a magnetic sensor. When the sensor determines that the conveyor is at the proper height, it stops elevating or descending, and the conveyor activates to transport the fixtures or kits to the traffic conveyor. The conveyor 'knows' when it is empty or full based upon detection of kits or fixtures between the rollers 72 by the sensor 74. In this manner, the operator can fill kits or fixtures at a comfortable position and move onto the next kitting conveyor without having to position or empty the full conveyor.

As was mentioned above, the example given here included the use of fixtures in the form of wash racks. However, the embodiments disclosed here do not require fixtures. Not using fixtures may alter operation of the conveyor system, as the system may no longer need the stacking return conveyor or the kitting return conveyor.

Other modifications may also become possible. The process steps may occur is other orders, such as kitting then assembling and then washing, etc. No particular order is required by the embodiments set forth here, nor should any be implied.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A conveyor system, comprising:
   a kitting conveyor subsystem arranged to transport kits to a washing station;
   a washing conveyor subsystem arranged to receive kits from a kitting conveyor subsystem and to transport washed kits towards an assembly station, the washing conveyor subsystem including at least one lift gate; and
   an assembly conveyor subsystem to receive washed kits from the washing conveyor subsystem and transport the kits to an assembly station, wherein the kits traverse the system from the kitting conveyor subsystem to the assembly station automatically without human intervention.

2. The conveyor subsystem of claim 1, the kitting conveyor subsystem including a kitting table conveyor having an adjustable height.

3. The conveyor subsystem of claim 2, the kitting table conveyor having a controller to return the kitting table conveyor to a home height, the home height being a height of a kitting return conveyor.

4. The conveyor subsystem of claim 1, the kitting conveyor subsystem arranged to transport kits is further arranged to transport fixtures into which the kits are stacked.

5. The conveyor subsystem of claim 4, wherein the kitting conveyor subsystem comprises a kitting return conveyor arranged to transport empty fixtures from the assembly station to a kitting station and a traffic conveyor arranged to transport kits to the washing station.

6. The conveyor subsystem of claim 4, wherein the assembly conveyor subsystem further comprises a stacking feed conveyor arranged to transport the fixtures from the assembly conveyor subsystem to the kitting subsystem and a stacking return conveyor arranged to transport empty fixtures away from the assembly station towards a kitting station.

7. The conveyor subsystem of claim 1, wherein the assembly conveyor subsystem resides in a clean room.

8. The conveyor subsystem of claim 7, wherein the assembly conveyor subsystem includes at least a partial tunnel arranged to protect kits exiting the washing conveyor subsystem.

9. A conveyor system, comprising:
   a kitting conveyor subsystem having at least one kitting table conveyor arranged to transfer fixtures containing completed kits to a traffic conveyor, and a kitting return conveyor arranged to transport empty fixtures to the kitting table conveyor;
   a washing conveyor subsystem having a feed conveyor arranged to feed the fixtures containing completed kits to a washline conveyor, the washline conveyor arranged to transport the fixtures containing completed kits through a washline; and
   an assembly conveyor subsystem having an exit conveyor to transport completed fixtures containing completed and washed kits to a stacking feed conveyor, the stacking feed conveyor arranged to transport the completed and washed kits to an assembly station, and a stacking return conveyor arranged to receive empty fixtures and transport them towards the kitting conveyor subsystem,
   the conveyor system arranged such that the fixtures traverse the conveyor system between the kitting conveyor subsystem and the assembly conveyor subsystem without human interaction in at least one direction.

10. The conveyor system of claim 9, wherein the kitting table conveyor is of adjustable height.

11. The conveyor system of claim 10, wherein the kitting table conveyor has a controller operable to return the kitting table conveyor to a height equal to that of the traffic conveyor.

12. The conveyor system of claim 9, wherein the assembly conveyor subsystem includes a spur conveyor arranged to accept any overflow of fixtures from the stacking feed conveyor.

13. The conveyor system of claim 9, wherein the assembly conveyor subsystem resides in a clean room.

14. The conveyor system of claim 13, wherein the clean room includes at least one assembly station arranged to allow operators to reach the stacking feed conveyor and the stacking return conveyor from a seated position.

15. The conveyor system of claim 9, wherein the fixtures comprise wash racks.

16. The conveyor system of claim 9, wherein the kits comprise sets of jet stack plates for a printer jet stack.

* * * * *